United States Patent [19]

Greig

[11] Patent Number: 5,071,295

[45] Date of Patent: Dec. 10, 1991

[54] CUTTERS

[75] Inventor: Alan Greig, Kent, England

[73] Assignee: Sanduik Limited, Halesowen, England

[21] Appl. No.: 505,405

[22] Filed: Apr. 6, 1990

[30] Foreign Application Priority Data

Apr. 7, 1989 [GB] United Kingdom ............... 8907890

[51] Int. Cl.$^5$ ............................................ B23B 51/10
[52] U.S. Cl. ........................... 408/225; 279/1 S; 408/201; 408/233
[58] Field of Search ............. 408/201, 211, 223–225, 408/233, 189–194, 196; 279/1 S

[56] References Cited

U.S. PATENT DOCUMENTS

| | | | |
|---|---|---|---|
| 3,063,312 | 11/1962 | Mueller | 408/191 |
| 3,575,520 | 4/1971 | Halpern | 408/225 X |
| 3,635,573 | 1/1972 | Halpern | 408/186 |
| 3,842,470 | 10/1974 | Hertel | 29/98 |
| 4,293,254 | 10/1981 | Markovics | 408/229 |
| 4,353,670 | 10/1982 | Jorgensen | 408/201 X |

FOREIGN PATENT DOCUMENTS

| | | |
|---|---|---|
| 3125480 | 1/1983 | Fed. Rep. of Germany . |
| 570098 | 12/1943 | United Kingdom . |
| 570099 | 12/1943 | United Kingdom . |
| 988263 | 4/1965 | United Kingdom . |
| 992384 | 5/1965 | United Kingdom . |
| 1304382 | 5/1970 | United Kingdom . |
| 1378868 | 12/1971 | United Kingdom . |
| 1378869 | 12/1971 | United Kingdom . |
| 2074061 | 10/1981 | United Kingdom . |
| 8700100 | 1/1987 | World Int. Prop. O. . |

*Primary Examiner*—Steven C. Bishop

[57] ABSTRACT

For cutting a facing such a countersink or a spot facing a rotary cutter is provided with a body having a central aperture arranged to receive a drill or other guide and at least one cutting insert carried by the body rotates with the drill or guide to cut the facing. The insert has a forward cutting edge which projects radially inwardly to form a step projecting inwards relative to the main body of the insert behind the cutting edge region. The drill has a radially recessed portion, such as the radial relief or the flute of the drill, to accommodate said step of the cutting edge region. Such a cutter can be designed to operate at high metal removal rates and can be used with standard forms of drill and reamer.

21 Claims, 4 Drawing Sheets

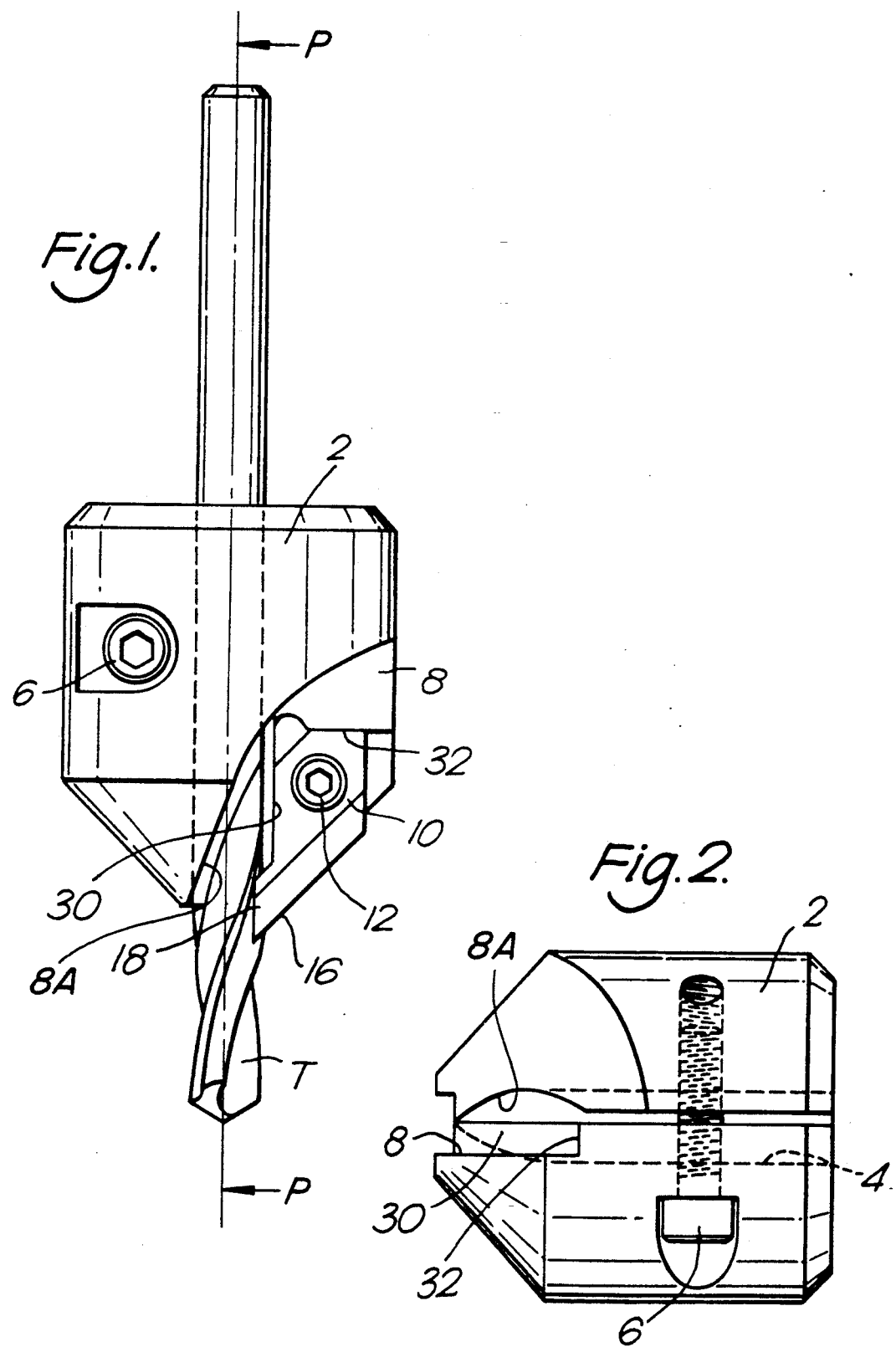

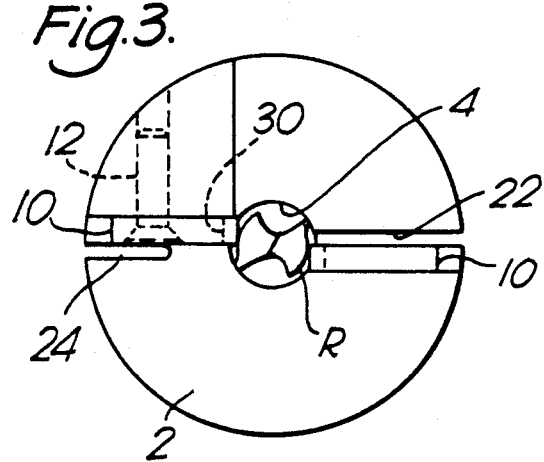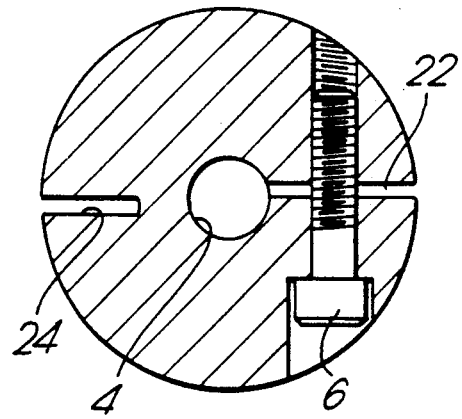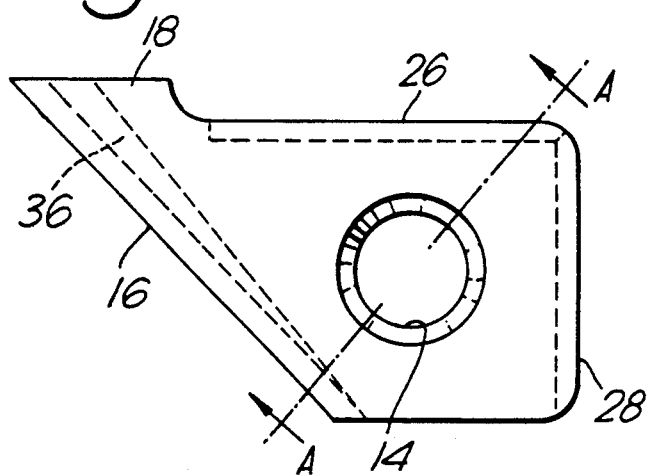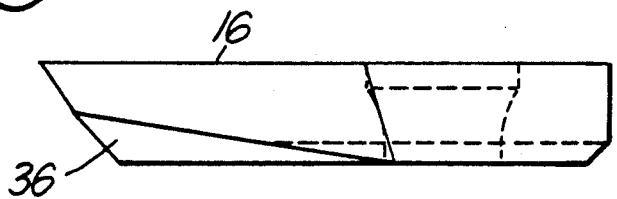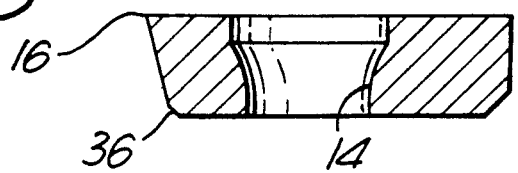

CUTTERS

BACKGROUND OF THE INVENTION

This invention relates to cutters for forming, at an open end of a bore or the like, a countersink or spot facing or other such ring-form surface of revolution concentric to the bore. It is particularly concerned with cutter attachments that can be adjustably assembled with a drill bit or other generally cylindrical leading element producing or fitting the bore.

The use of such cutter attachments mounted upon tools such as twist drills is well known as a means of drilling and countersinking a hole in a single operation. As examples can be mentioned British Patents 1378869, 1378868, 1304382, 988263, 570099 and 570098.

These earlier cutter attachments have disadvantages, however, particularly if they are to be used at the high rates of material removal associated with current cutting technology. They have a tubular body with a central bore in which the associated drill bit can slide for the purpose of axial adjustability, the countersink cutting edges on the body projecting outwardly at the sides of the bore. These cutting edges have a limited operating life before resharpening is required, since they are formed from the same material as the cutter body. Some improvement in this respect is obtained by providing cutter bodies with brazed-on tungsten carbide tips but with all forms of this type of cutter attachment there are high servicing costs because regrinding and resetting is both expensive and time-consuming.

In U.S. Pat. No. 4353670 this problem is addressed by providing a special form of drill bit or other carrier for the cutter attachment, a flat recess being formed on the otherwise generally cylindrical carrier and the attachment is arranged to be clamped on the flat recess. A cutting insert of the attachment has its main body disposed partially in the recess or, in the case of a twist drill, in a drill flute that forms an extension of the recess. It is a disadvantage, however, only to be able to use the attachment on a specially adapted carrier.

SUMMARY OF THE INVENTION

According to one aspect of the present invention, there is provided a rotary cutter for forming a countersink or spot facing or other ring-form surface of revolution concentric to a bore in a workpiece, comprising a body having a central longitudinal aperture for receiving an elongate leading element, such as a drill bit or a cylindrical guide, projecting forwardly of said body for locating the cutter radially relative to said bore, means for clamping said leading element and said body together in an axially adjustable manner, at least one cutting insert mounted on said body for cutting said surface with the rotation of the cutter, the insert having a main body at a forward portion of which there is a cutting edge region extending radially inwardly to form a step projecting inwards relative to the main body of the insert behind said region, the leading element having a radially recessed portion or portions to accommodate said step of the cutting edge region.

According to another aspect of the invention, there is provided a rotary cutter attachment comprising a body having a central longitudinal aperture to receive a leading element for locating the attachment radially relative to a bore in a workpiece to form a countersink or spot facing or other ring-form surface of revolution concentric to said bore, the body being provided with means to clamping said leading element releasably in said central aperture and carrying at least one cutting insert for forming said ring-form surface of revolution, the insert comprising a main body having a forward cutting edge region which projects radially inwardly to form a stepped extension of the main body behind said cutting edge region, said extension projecting inwardly of the radius of said longitudinal aperture at the forward end of the body.

According to a further aspect of the invention, there is provided a cutting insert for use in forming a countersink or spot face or other ring-form surface of revolution at the entry to a bore in a workpiece, the insert having a main body of generally plate-like form with an edge region defining a forward cutting edge of the insert, said region comprising a lateral extension beyond the width of the main body to form on that main body a step that is arranged to lie radially innermost when the insert is mounted on a rotary carrier for cutting said surface.

The invention will be described by way of example with reference to the accompanying drawings.

BRIEF DESCRIPTION OF THE DRAWINGS

FIG. 1 is a side view of a combination of drill and countersink cutter attachment employing the invention, FIG. 2 to 4 illustrate the carrier body of the cutter attachment in FIG. 1 in more detail, being side, end and cross-sectional views respectively, the cutting inserts being shown only in FIG. 3, FIGS. 5 to 7 illustrate the cutting insert of the cutter attachment in FIG. 1 in plan and side views and a section on the line A—A in FIG. 5, respectively.

DESCRIPTION OF THE PREFERRED EMBODIMENTS

Figure 8:
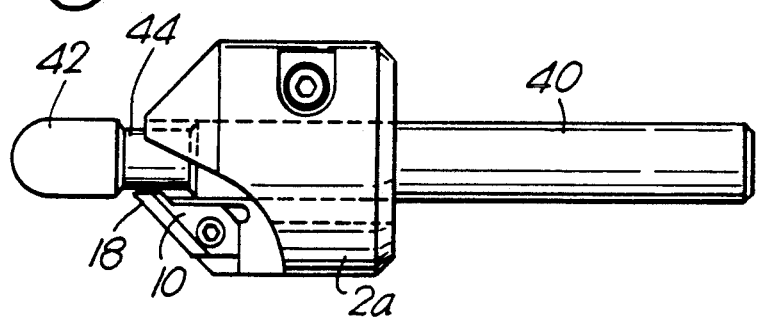
FIGS. 8 to 10 illustrate alternative combinations of leading elements and cutter attachments according to the invention.

FIG. 1 illustrates a cutter attachment according to the invention mounted on a conventional twist drill T, the attachment comprising a tubular body 2 with a central aperture or bore 4 in which a leading element such as a drill bit T is a free fit. The body 2 can be slid along the drill bit to the required distance from the tip of the bit and be secured in place on the drill bit by a clamping screw 6. In diametrically opposite recesses 8 at the front of the body a pair of plate-like cutting inserts 10 are clamped by screws 12 inserted through central holes 14 (FIG. 5) in the main bodies of the inserts. The insert receiving recess 8 includes a generally forwardly facing surface 8A which extends to the opposite side of a center plane P—P which includes the longitudinal axis of aperture 4. Such an arrangement greatly improves cutting performance by creating a large, unobstructed path for the passage of cuttings.

Each insert has a forward cutting edge 16 lying at an oblique angle to the drill axis and the cutting edge region is given a lateral extension 18 from the main body of the insert to project into the cutting radius of the drill bit itself. The extension 18 is accommodated in a flute of the drill bit or, as shown in FIG. 3, in the relief R behind a side cutting edge of the drill bit. Like the tubular body 2, however, the main body of the insert 10 lies on or outside the cutting radius of the drill bit so that the attachment can be secured with the extension 18 at any position along the drill flutes or reliefs.

The recesses in the attachment body locate the inserts with their top faces, and therefore their cutting edges, in a diametrical plane of the drill bit and attachment body. Bounded by the same diametrical plane are a pair of slots 22,24 extending the length of the carrier body, one slot 22 running through the radial thickness of the body and the other slot 24 through only part of that thickness from the outer periphery. The clamping screw 6 bridges the first slot 22 and, when tightened, draws the faces of the slot together so as to clamp the body onto the drill bit passing through its bore.

The cutting insert, as can be seen more clearly in FIGS. 5 to 7, has its cutting edge 16 at an angle of 45° to the side and rear edges 26,28 of the insert that are held against axial and radial faces 30,32 respectively of a seating in each recess 8 of the attachment body, the insert thus being set to cut a countersink at a corresponding angle. The inner side edge 26 lies at a slightly greater radius than the bore 4, as indicated in FIG. 3, but the lateral extension 18 from the main body of the insert at the cutting edge region projects inwards into the bore radius.

The front face at the cutting edge 16 has a clearance angle of 15° when measured in a radial plane of the clamping hole 14 of the insert perpendicular to the cutting edge 16, (i.e. the plane of FIG. 7). The lower region of the insert front face also has an angled relief face 36 at 45° (when measured in the same plane) in order to give the insert an adequate clearance at smaller cutting radii. For this purpose, the front face relief is greatest at the radially inner end of the face and its width tapers progressively from that end.

The same form of insert and cutter attachment can be employed in the plain-piloted countersinking tool illustrated in FIG. 8, which is generally similar to the attachment of the preceding figures but has a body 2a with a single cutting insert 10. The attachment is shown mounted on a leading element which comprises a non-cutting pilot spindle 40 having a cylindrical nose 42 and a circumferential relief 44 that accommodates the lateral projection 18 of the insert extending inwardly of the spindle radius in front of the relief.

Figure 9:
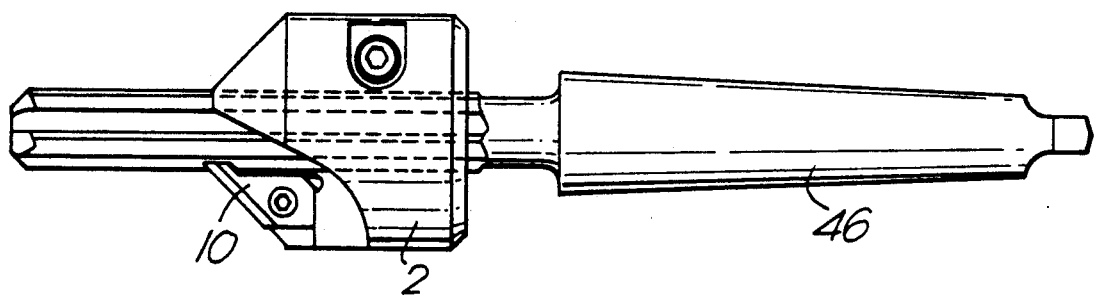

If it is required to form a countersink or the like in conjunction with a reaming operation, the cutter attachment already described can be mounted on a leading element in the form of a reamer 46, as is illustrated in FIG. 9. In an analogous manner, the lateral projection 18 on the or each insert extends into the flutes or the cutting edge relief of the reamer so that the minimum cutting radius of the insert lies within the cutting radius of the reamer.

Figure 10:
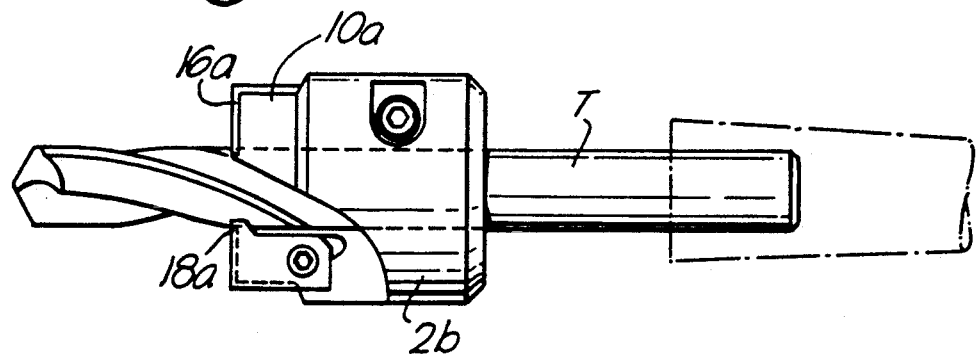

FIG. 10 illustrates a modified form of cutting insert 10a with a cutting edge 16a and extension 18a at right-angles to the axis of the drill bit T on which it is mounted for a combined drilling and spot-facing operation. The forward end of the cutter attachment body 2b provides insert seatings that conform generally to the right-angled configuration of the inserts, but in other respects the body 2b can be similar to the attachment body already described in more detail above.

Figure 11:
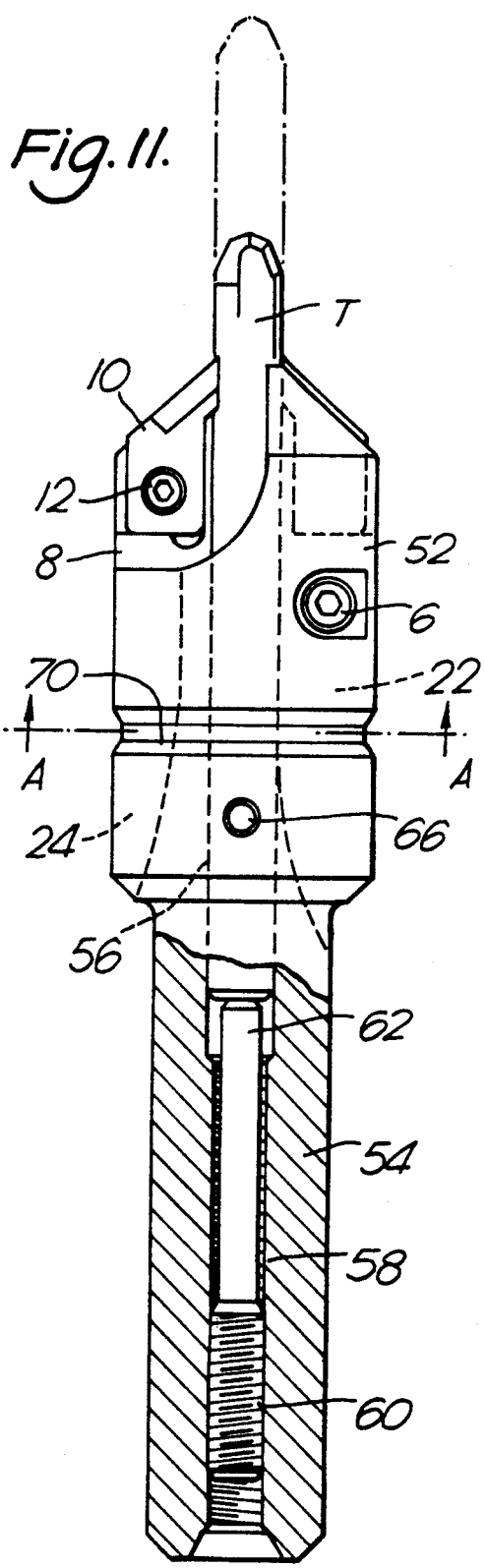
FIGS. 11 and 12 illustrate, in partly sectioned side view and in transverse section on the line A—A in FIG. 11 respectively, a further combination of drill and attachment according to the invention.
Figure 12:
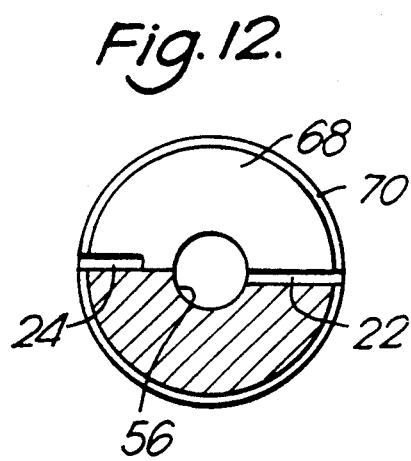

In the example of FIGS. 11 and 12 corresponding parts to those already described are indicated by the same reference numbers. The cutter comprises a countersink attachment with a body 52 having an integral shank 54 at the rear. An aperture or bore 56 extends through the body 52 and the shank 54. A drill bit T is located in the bore 56 to project forwards of the body. Within the shank 54 the bore 56 is given a screw thread 58 which engages a setting element in the form of a screw 60 that has a smaller diameter stem 62 extending forward from the threaded portion of the screw. The stem 62 provides a locating abutment for the rear end of the drill bit T. By driving the screw 60 a greater or lesser distance into the bore thread the location of the drill bit and hence the extent to which it projects from the front of the body is determined. The bit can be locked in the set position by a grub screw 66 threaded into the body 52. This is additional to the clamping screw 6.

The same form of cutting inserts 10 are shown a the first-described example and they are mounted in a similar manner. The body 52 also has the two slots 22,24 but these run out in the region of the junction between the body and the shank 54. To allow the body portions on opposite sides of the slot 22 to be contracted together by the clamping screw 6 sufficiently to grip the bit T in the bore, a further slot 68 is formed in a transverse radial plane rearwards of the inserts. A circumferential recess 70 forms chamfers at the edges of the slot 68. It will be seen that the transverse slot 68 leaves the front portion of one half of the body attached to the remainder of the body only by the thickness of material remaining between the slot 24 and the bore 4.

It will be apparent that other configurations of cutter attachment and cutting insert can be similarly provided within the scope of the present invention.

The inserts can be made of a variety of materials, including high-speed steel, tungsten carbide, ceramic, polycrystalline diamond and polycrystalline cubic boron nitride.

I claim:

1. A rotary cutter for forming a ring-form surface of a revolution concentric to a bore in a workpiece, said cutter comprising a body, a central longitudinal aperture in said body, an elongate leading element received in said aperture to project forwardly of said body for locating the cutter radially relative to a workpiece bore, means for clamping said leading element and said body together in an axially adjustable manner, at least one cutting insert mounted on said body for cutting said ring-form surface upon rotation of the cutter, said insert having a main body and a cutting edge region at a forward portion of said insert main body, an extension of said cutting edge region projecting radially inwardly from said main body of the insert to form a step projecting radially inwards relative to said aperture of said main body, a coaxial shank integral with said body and extending rearwardly thereof, said shank having a longitudinal bore opening into said aperture, a setting element in said bore projecting forwardly for abutting a rear end of said leading element in said body aperture, means for axially displacing said setting element in said bore to adjust the extent to which said leading element protrudes axially from said body.

2. A cutter according to claim 1 attachment wherein at least one axially directed slot is provided in said cutter body for permitting resilient deformation of said body to clamp the leading element in said aperture.

3. A cutter according to claim 2 wherein said clamping means are arranged forwardly of said shank.

4. A rotary cutter according to claim 2, wherein two axially directed slots are provided on opposite sides of said aperture, one of said slots extending radially through said body from said aperture to an outer periphery of said body.

5. A cutter according to claim 1 wherein the or each cutting insert has a top face substantially in a plane radial to the rotary axis.

6. A rotary cutter according to claim 1, wherein said body includes a recess in which said cutting insert is mounted, said recess including a radially outwardly facing seating face against which said main body of said cutting insert is seated, said extension passing laterally across a front end of said face and into a front-to-rear extending groove in said leading element.

7. A rotary cutter according to claim 1, wherein at least one axially directed slot is provided in said cutter body for permitting resilient deformation of said body to clamp the leading element in said aperture.

8. A rotary cutter according to claim 7, wherein said seating surface extends parallel to a longitudinal axis of said aperture.

9. A rotary cutter according to claim 7, wherein said cutting insert is situated to one side of a center plane containing longitudinal axis of said aperture, said recess in which said cutting insert is situated including a generally forwardly facing surface extending to a side of said center plane opposite said one side.

10. A rotary cutter according to claim 6, wherein said groove in said leading element extends helically.

11. A cutting insert for use in forming a ring-form surface of revolution at the entry to a bore in a workpiece, the insert having a main body of generally plate-like form, said main body having a width, a forward portion of said body comprising a cutting edge region extending across said width and comprising a forward cutting edge of the insert and a front face extending from said cutting edge, said cutting edge region having a lateral extension beyond the width of the main body to form on the main body a step that lies radially innermost when the insert is mounted on a rotary carrier for cutting said surface, said front face having a clearance angle, respective portions of said front face nearer to and further from said cutting edge having different clearance angle values in which the magnitude of the angle value of said further portion is greater than the magnitude of the angle of said nearer portion.

12. An insert according to claim 11 wherein said further portion has a width that decreases with distance from said lateral extension.

13. A rotary cutter for forming a ring-form surface of a revolution concentric to a bore in a workpiece, said cutter comprising a body, a central longitudinal aperture in said body, an elongate leading element received in said aperture to project forwardly of said body for locating the cutter radially relative to a workpiece bore, a coaxial shank extending rearwardly on said body, setting means held by said shank for determining the position of said leading element axially of the body, clamping means for securing said leading element and body together comprising a slot in said body opening to said aperture, said slot extending radially to an outer periphery of said body and axially from a forward end of said body, tightening means for drawing together opposite faces of said slot to thereby contract the cross-section of said aperture to clamp said leading element, a recess disposed in said body rearwardly of said tightening means, said recess lying within a plane oriented transversely across said body and opening into said slot, whereby said contraction of said aperture is confined to said body forwards of said recess.

14. A rotary cutter attachment comprising a body, a central longitudinal aperture in said body for receiving a leading element to locate the attachment radially relative to a bore in a workpiece to form a ring-form surface of revolution concentric to the bore, the body being provided with means for clamping the leading element releasably in said aperture, at least one cutting insert removably received on said body for cutting said ring-form surface of revolution, said insert comprising a main body and a forward cutting edge region at a forward portion of said main body, said cutting edge region projecting radially inwardly in the form of a stepped extension of said main body, a radial dimension of said longitudinal aperture of said body being overlapped by said radially projecting extension, said main body of said insert having a radially inner face extending generally parallel to said aperture, a coaxial shank integral with said body extending rearwardly thereof and having a longitudinal bore opening into said aperture, a setting element in said bore projecting forwardly for abutting a rear end of the leading element, means for axial adjustment of said setting element in said bore to adjust the extent to which the leading element projects axially from said body.

15. A cutter attachment according to claim 14 wherein at least one axially directed slot is provided in said cutter body for permitting resilient deformation of said body to clamp the leading element in said aperture.

16. A cutter attachment according to claim 14 wherein the or each cutting insert has a top face substantially in a plane radial to the rotary axis.

17. A rotary cutter attachment according to claim 14, wherein two axially directed slots are provided on opposite sides of said aperture, one of said slots extending radially through said cutter body from said aperture to an outer periphery of said body to permit deformation of said body to clamp the leading element.

18. A cutter according to claim 17 wherein a coaxial shank portion extends rearwardly on the body and said clamping means are arranged forwardly thereof, a recess extending transversely across said body between said clamping means and said shank portion and said recess intersecting said axially directed slots.

19. A cutter attachment according to claim 18 wherein setting means are held by said shank portion for determining the position of the leading element axially of the body.

20. A rotary cutter for forming a ring-form surface of revolution concentric to a bore in a workpiece, said cutter comprising a body, a central longitudinal aperture in said body, an elongate leading element disposed in said aperture to locate the cutter radially relative to a bore in a workpiece, said body including at least one axially directed slot for permitting resilient deformation of said body, tightening means for drawing together opposite faces of said slot to clamp said leading element in said aperture, said body including a recess, said recess including a radially outwardly facing seating face, a cutting insert removably received in said recess for cutting a ring-form surface of revolution, said insert comprising a main body seated against said seating face and a forward cutting edge region disposed at a forward portion of said main body, said cutting edge region projecting radially inwardly in the form of a stepped extension of said main body, said stepped extension passing laterally across a front end of said seating face and into a front-to-rear extending groove in said leading element.

21. A rotary cutter according to claim 20, wherein said seating face extends parallel to a longitudinal axis of said aperture.

* * * * *